Dec. 24, 1957 P. E. FENTON 2,817,134
SNAP FASTENER
Filed Aug. 17, 1953
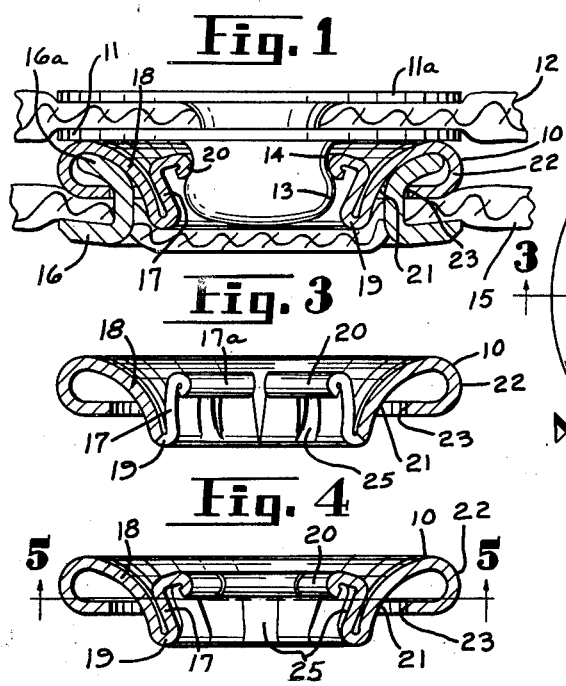
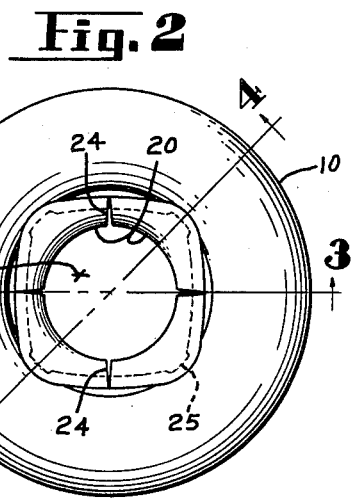
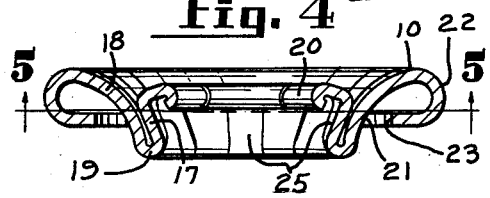
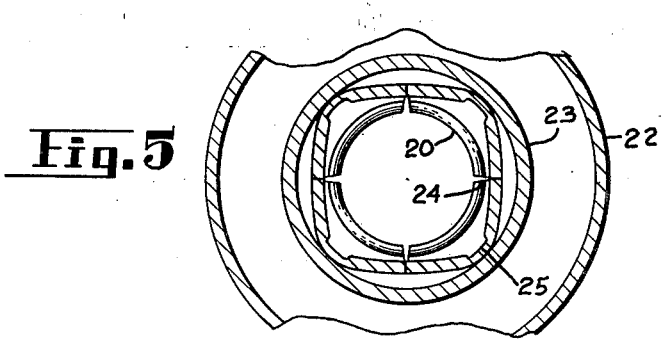
INVENTOR
Paul E. Fenton
BY *H. T. Johnston*
ATTORNEY

United States Patent Office 2,817,134
Patented Dec. 24, 1957

2,817,134

SNAP FASTENER

Paul E. Fenton, Middlebury, Conn., assignor to Scovill Manufacturing Company, Waterbury, Conn., a corporation of Connecticut Application August 17, 1953, Serial No. 374,591

1 Claim. (Cl. 24—216)

This invention is an improved snap fastener socket member for use in that type of snap fastener combination which is commonly referred to as a laundry-proof snap fastener.

Although laundry-proof snap fasteners have come into wide use since the invention of the socket member shown in Fenton Patent No. 2,106,728 they have always been found wanting in certain respects especially when their use has been extended to garments where the fasteners might be subject to considerable lateral stress. This was due mainly to the distortion of the spring fingers of the socket member beyond their elastic limits after which the stud and socket would not snap together properly.

Attempts to meet this problem are exemplified by patents to Dews, No. 2,129,825, and Fenton, No. 2,371,813. In those cases an extra member was provided as "armor" which added so much to the bulk and expense of the fastener that it found only a limited field of application. The need was obviously for a snap fastener socket of the so-called one-piece type which could be manufactured inexpensively in a single machine and without requiring assembling operations. It may be noted here than "one-piece member" means one-piece aside from the prong ring which is used to attach it to a garment by insertion of the prongs through the garment material into clinching engagement with a breast portion surrounding the spring fingers of the socket member. The wall of the breast portion of such a socket member necessarily starts off with a lead-in angle for the prongs to take care of slight variations in the location of the prongs relative to the socket during the attaching operation. It must also curve outwardly so as to bend the prongs into engagement with the retaining ring. This has always required that the breast wall be so far away from the fingers that there was nothing to back them up so that they might be quite easily distorted when a strong lateral pull was placed on any one of the fingers by the stud.

The central barrel portion which is slitted to provide the spring fingers has taken a generally circular form. According to my invention I provide beads on the ends of the fingers which are in circular arrangement to define a circular stud receiving opening, but the cross-section of each finger is non-circular, preferably angular, so that a portion of each finger is located sufficiently close to the surrounding breast wall that it will be supported thereby so that it cannot be distorted beyond its elastic limit by lateral stress. Expressed in another way, I provide on the inside face of each finger a lengthwise extending flute or groove so as to displace the intermediate part of each finger outwardly for the required distance to accomplish my purpose. By thus localizing the outward deformation of the fingers my improved socket may be manufactured without additional steps and without unduly distorting the central barrel portion so as to cause the metal to crack.

The formation of the lengthwise extending grooves or flutes is accomplished by a simple step in the process of manufacture.

Other objects and advantages of my invention will hereinafter more fully appear.

In the drawing:

Fig. 1 is a sectional view of a snap fastener installation constructed in accordance with the invention and showing a conventional stud assembly therewith.

Fig. 2 is a plan view of the socket, per se.

Fig. 3 is a vertical cross-sectional view of the socket member, the view taken along the line 3—3 of Fig. 2.

Fig. 4 is a similar cross-sectional view of the same, taken along the line 4—4 of Fig. 2.

Fig. 5 is a horizontal cross-section through the central barrel portion on the line 5—5 of Fig. 3.

In the drawing, Fig. 1 shows a snap fastener installation comprising a socket 10 and a conventional stud 11 of circular cross section. The stud 11 is affixed to a supporting sheet 12 in the usual manner as by a rivet post 11a. The stud 11 is formed with the usual enlarged head 13 and reduced neck 14.

The socket member 10 is mounted upon a suitable support 15 as by means of an attaching prong ring 16 of well known construction. The socket member 10 comprises a central barrel portion slitted to provide a series of resilient fingers 17 arranged around a stud-receiving opening 17a within an annular breast portion 18 and are integrally joined thereto by a U-shaped connecting section 19. It is to be noted from Fig. 3 that the fingers 17 extend substantially straight upwardly from their connecting section 19 and terminate at their free ends in inwardly rolled beads or lips 20 which are in circular arrangement to define the stud receiving opening 17a.

The breast portion 18 of my improved socket starts from the U-shaped connecting section 19 and is flared upwardly and outwardly to form a gently sloping anvil section 21 and terminates in an annular rim 22 of U-shape in cross-section. The edge of the annular rim 22 is spaced from the anvil section 21 to provide an annular opening 23 through which the prongs 16a of the prong ring may be inserted and biased outwardly by said anvil section 21 in the setting operation.

In order to provide the right amount of resiliency for the spring fingers for releasable and holding engagement with the stud 11, I prefer to use four individual fingers 17 separated by slits 24. Also to prevent the fingers 17 from being distorted beyond their elastic limits if subjected to any severe lateral strains, each finger is formed with a longitudinal flute or groove 25 running lengthwise and on the inner surface thereof at substantially a mid point between the side edges of the fingers. This fluting of the interior of the fingers will distort the outer circumference of the fingers outwardly so that the general arrangement of the fingers, in toto, will be substantially square as seen in Fig. 2 and consequently the high points or apices of the protuberance of each finger will be relatively close to the surrounding breast portion 18. Each finger may be described as angular in cross-section although the corner is not a sharp corner. The distance that each corner is spaced from the surrounding anvil portion is approximately .004" to .008" and it is this distance that the fingers will be permitted to spring outwardly without being distorted beyond their elastic limits. It is to be noted that while the fluting of the fingers causes the outer circumference of the fingers to assume generally a square shape the inner periphery of the rolled beads for gripping the stud will still remain in a circular arrangement.

While certain changes may be made in the construction as illustrated which are well within the skill of the ordinary mechanic, it is intended that the foregoing shall be considered in a descriptive rather than in a limiting sense.

What I claim is:

In a laundry-proof snap fastener installation of the type having a socket member adapted for snap engagement with a stud member of circular cross section, which socket member is attachable to sheet-like supporting material by means of a pronged ring insertable through the material into engagement with said socket member; said socket member comprising a single piece of sheet metal shaped to provide a central barrel portion slitted to provide a plurality of resilient fingers, the free ends of said fingers being turned radially inwardly to form stud-gripping beads, said beads being in circular arrangement and defining a central stud receiving opening, and a breast portion surrounding said fingers and having its inner lower edge integrally joined to said fingers, said breast portion extending from its inner lower edge in a continuous upward and outward slope to provide an anvil surface for outwardly deflecting the prongs of a prong ring, said breast portion terminating in a U-shaped annular rim to provide an inturned retaining ring for the outwardly deflected prongs, each of said fingers having on its inner face a lengthwise extending flute or groove intermediate the side edges thereof to deform the intermediate portion of each said fingers outwardly and into close proximity to the breast portion so that any lateral movement of said fingers beyond their elastic limit is prevented.

References Cited in the file of this patent

UNITED STATES PATENTS

| | | |
|---|---|---|
| 878,550 | Mead | Feb. 11, 1908 |
| 2,015,049 | Carr | Sept. 17, 1935 |
| 2,440,684 | Huelster | May 4, 1948 |

FOREIGN PATENTS

| | | |
|---|---|---|
| 6,688 | Great Britain | Apr. 18, 1889 |